Dec. 22, 1936. K. R. HAMMERSTROM 2,065,453
CAR TRUCK SIDE FRAME
Filed Aug. 2, 1935 4 Sheets-Sheet 2
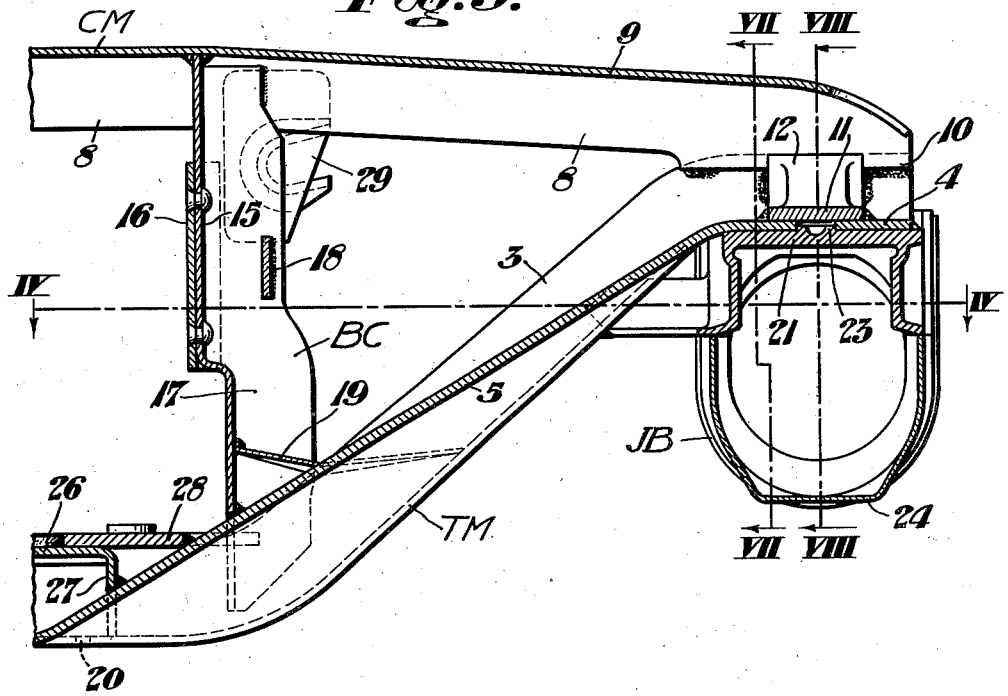
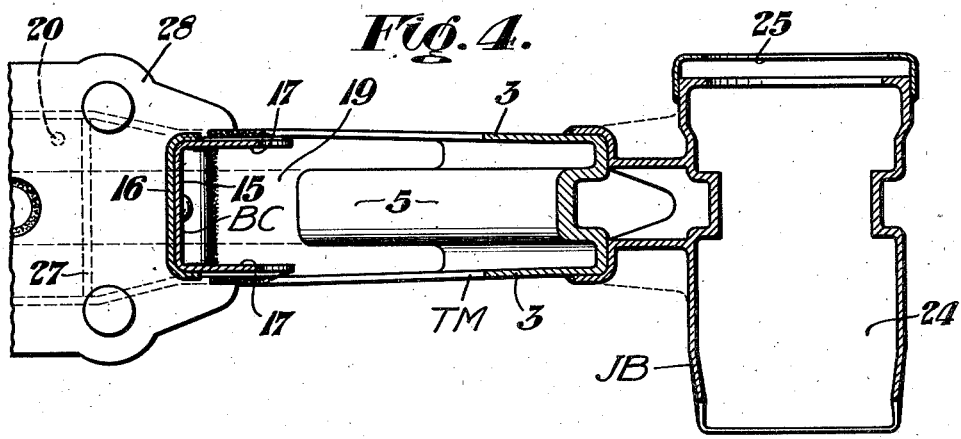
Inventor:
KARL R. HAMMERSTROM,
by: Usina & Rauber
his Attorneys.

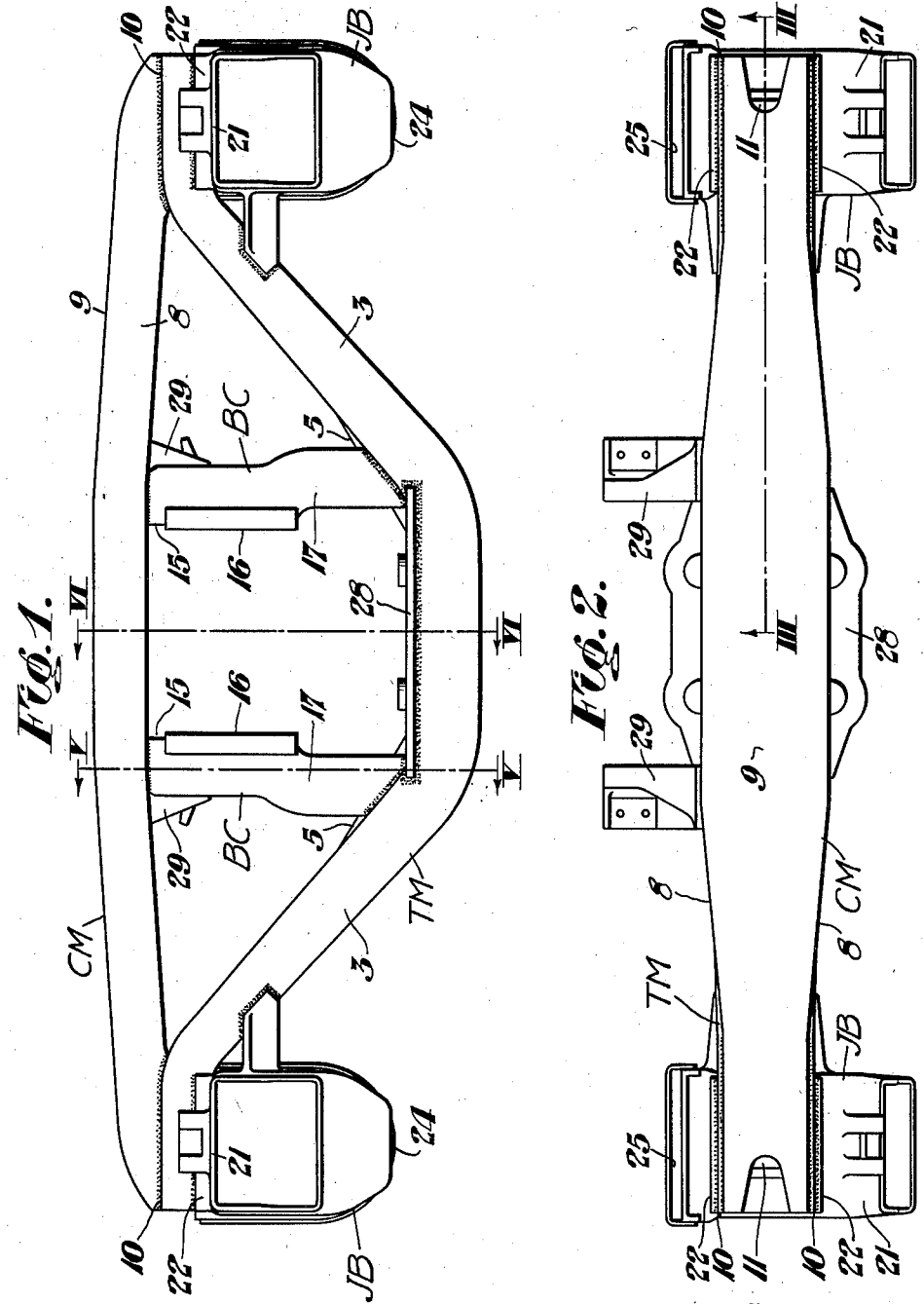

Dec. 22, 1936.    K. R. HAMMERSTROM    2,065,453
CAR TRUCK SIDE FRAME
Filed Aug. 2, 1935    4 Sheets-Sheet 3

Inventor:
KARL R. HAMMERSTROM,
by Usina & Rauber
his Attorneys.

Dec. 22, 1936.   K. R. HAMMERSTROM   2,065,453
CAR TRUCK SIDE FRAME
Filed Aug. 2, 1935   4 Sheets-Sheet 4
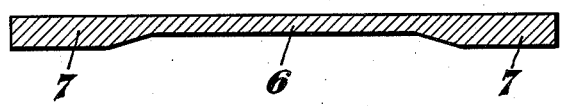
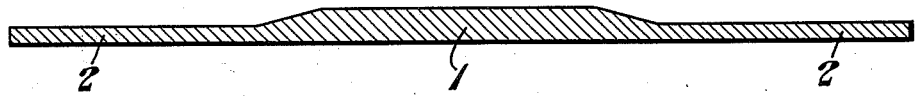
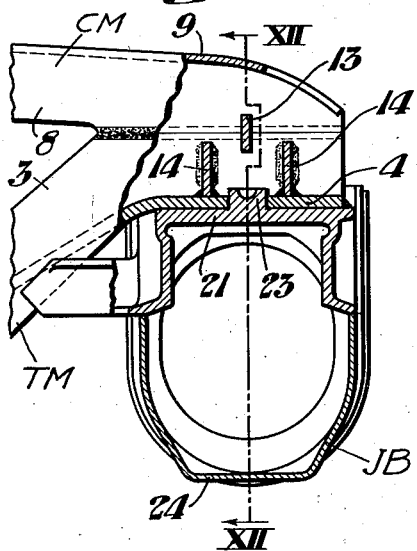
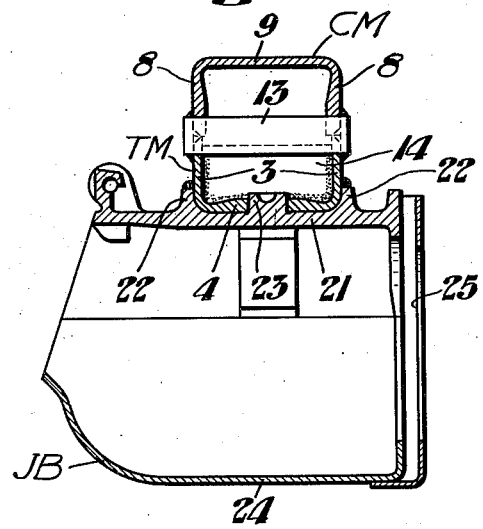
Inventor:
KARL R. HAMMERSTROM,
by: Usina & Rauber
his Attorneys.

Patented Dec. 22, 1936

2,065,453

UNITED STATES PATENT OFFICE 2,065,453

CAR TRUCK SIDE FRAME

Karl R. Hammerstrom, Dormont, Pa., assignor to Railroad Research Bureau of the Subsidiary Manufacturing Companies of the United States Steel Corporation Application August 2, 1935, Serial No. 34,450

5 Claims. (Cl. 105—206)

This invention relates to car truck side frames. One of the objects is to produce a practical side frame made mainly of parts worked to form from rolled steel. Another object is to produce a lightweight side frame that is sufficiently rugged to meet the severe operating conditions encountered by such constructions. Other objects may be inferred from the nature of the invention.

A specific example of a car truck side frame that embodies the principles of the present invention is illustrated by the accompanying drawings, in which:

Figure 1 shows the outside of this side frame.

Figure 2 shows the top.

Figure 3 is a longitudinal section taken in a vertical plane from the line III—III in Figure 2.

Figure 4 is a longitudinal section taken in a horizontal plane from the line IV—IV in Figure 3.

Figures 9 and 10 show cross-sections of rolled steel plate sections from which various parts of the side frame are worked.

Figure 11 shows a modification of the end of the side frame shown by Figure 3 in the same sectional manner the latter shows the preferred construction.

Figure 12 is a cross-section taken from the line XII—XII in Figure 11.

Figure 5:
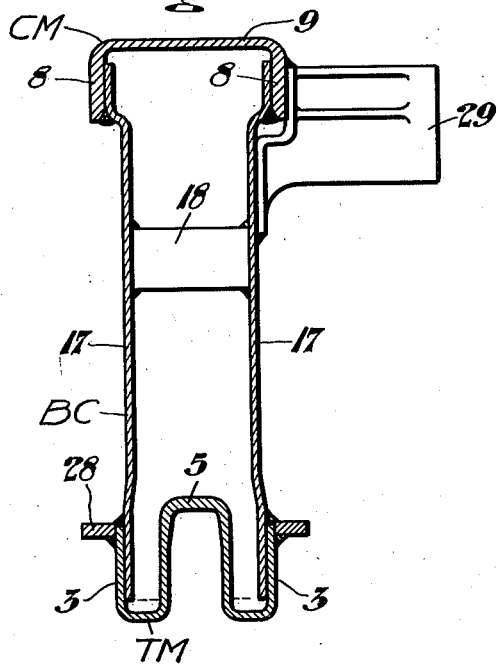
Figures 5 and 6 are cross-sections respectively taken from the lines V—V and VI—VI in Figure 1.
Figure 6:
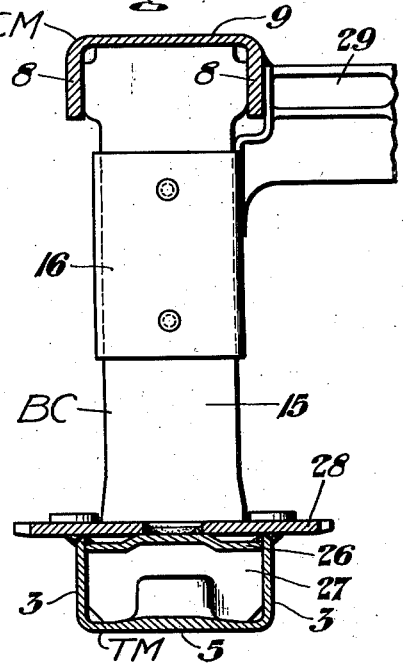

More specifically, this side frame includes a tension member TM, a compression member CM, bolster columns BC and journal boxes JB, these parts being arranged in their usual relationship.

The tension member TM is characterized in that it is made from a rolled steel plate section (see Figure 10) having a longitudinally extending central portion 1 of greater thickness than its edge portions 2 and which is worked into a channel section of appropriate contour with upstanding flanges 3 and a web 4 that is flat at least at the journal box connecting and middle portions of the tension member and which gradually changes into inverted channel sections 5 which reach maximum depths at positions where the bolster columns BC connect with the member being described. It is to be noted that the edge portions 2 of the plate section form the flanges 3 of this tension member and that the thicker central portion 1 forms the web 4 as well as the webs of the inverted channels 5 and, to considerable extents, the latter's flanges.

Likewise, the compression member CM is characterized in that it is made from a rolled steel plate section. However, as is shown by Figure 9, this section has a longitudinally extending central portion 6 of less thickness than its edge portions 7 and is worked into a channel section of appropriate contour with depending flanges 8 and a web 9 that is substantially flat throughout the entire length of the member. It follows that the thicker edge portions 7 of this plate section form the flanges 8 of the compression member, while the thinner central portion 6 forms the web 9 of this member.

Figure 7:
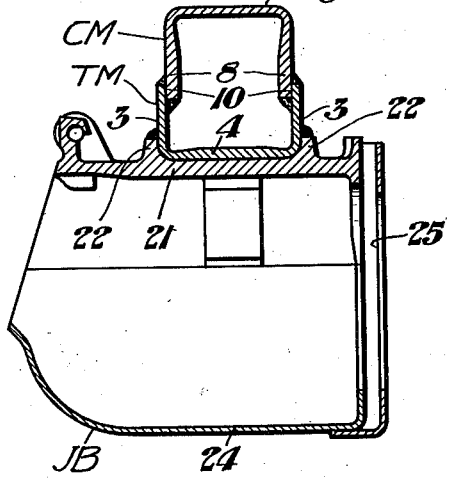
Figures 7 and 8 are cross-sections respectively taken from the lines VII—VII and VIII—VIII in Figure 3.
Figure 8:
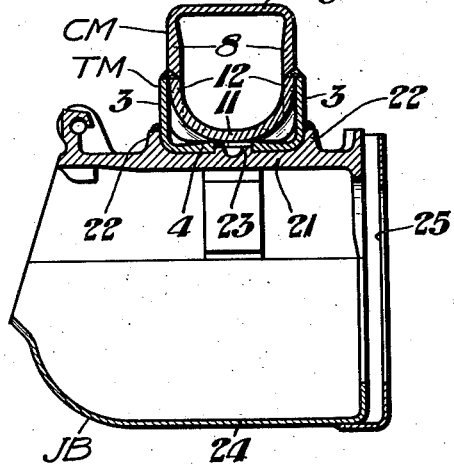

To interconnect the respective ends of the above described members, the depending flanges of the compression member CM are partially telescoped, as at 10 in Figure 7, within the adjacent portions of the upstanding flanges 3 of the tension member TM, and shear members 11 (see Figure 8) rest on the web 4 of the tension member between these partially telescoped flanges and provide upstanding arms 12 on which the adjacent edges of the depending flanges 8 of the compression member rest. These depending flanges 8 are cut to partially receive the arms 12, and the adjacent portions of the upstanding and depending flanges 3 and 8 of the two members and of the shear members 11 are welded together at appropriate positions to form integral end constructions.

In the modification shown by Figures 11 and 12, the adjacent edges of the upstanding and depending flanges 3 and 8 are butted together instead of being partially telescoped. Shear pins 13 are passed transversely through the abutting edges of these flanges, and stiffening plates 14 are arranged transversely within the upstanding flanges with their ends against the insides of the latter. These abutting edges, shear pins and stiffening plates are all welded together at appropriate positions to also form an integral construction.

The bolster columns BC are formed from flat rolled steel plates which are worked into channel sections whose web outsides provide flat inwardly facing surfaces 15 to which wearing plates 16 are applied. Their flanges 17 extend away from the center of the side frame and are provided with stiffening plates 18. These bolster columns and the stiffening plates 18 are welded together and the former are welded to the compression member CM and tension member TM so as to contribute toward the integral construction of the whole. The wearing plates 16 are illustrated as being riveted in place so that they may be replaced when desired. However, it is perfectly possible that these can be welded into position.

It may be that there is a possibility of foreign matter, such as cinders and the like, falling into the channel section of the tension member. To prevent this, plates 19 are cut to fit between the flanges 17 of the bolster columns and to fit closely about the inverted channels 5 and between the upstanding flanges 3 of the tension member. These plates are substantially horizontal and are welded into place. By this means foreign matter is prevented from falling into the wells provided by the shape of the tension member. The latter is also provided with drain holes 20 for the purpose of preventing water accumulating in their lower or well-like parts.

The journal boxes JB have flat roofs 21 on which the adjacent portions of the web 4 of the tension member TM rest. These roofs are provided with upstanding shoulders 22 which proximately parallel the sides of the upstanding flanges 3 of the tension member, and are also provided with bosses 23, the web 4 being apertured to receive these. The adjacent surfaces of these webs and flanges are welded together to make the journal box roofs 21 integral with the ends of the tension member. The journal boxes also include bottoms 24 and dust guard pockets 25, these being worked from rolled steel plates into proper forms and welded together and to the roofs 21.

A plate 26 is placed between the upstanding flanges 3 of the tension member TM with its top side flush with the edges of these flanges and its ends shaped into depending legs 27 which rest on the tops of the inverted channel sections 5. A spring plank seat 28 rests on the top side of this plate 26 and the edges of the upstanding flanges 3, the plate 26 and its legs 27, the spring plank seat 28 and the tension member all being welded together at appropriate positions.

Brake hanger brackets 29 are welded to the depending flanges 8 of the compression member and flanges 17 of the bolster columns BC. These brackets are of conventional shape.

It is now apparent that the side frame illustrated by the drawings is made mainly of rolled steel plates or plate sections and is of an integral character throughout due to its welded construction. The positions of the various weldings are illustrated by the drawings but have not been described for the reason that it is fairly obvious that all adjacent surfaces and edges should be united in all possible instances, although it is possible to eliminate welding at some points without greatly detracting from the strength of the whole. The use of the rolled steel plate sections illustrated by Figures 9 and 10 are of advantage in that they provide for greater strength where it is needed without materially increasing the weight of the members involved over that to be expected from the use of flat plates. The shear members 11 or shear pins 13, as the case may be, and the bosses 23, are of advantage in that they provide for easy positioning of the parts during fabrication of the side frame and, furthermore, in that they take up a considerable portion of the shear which would otherwise have to be withstood by the various welds.

Although a specific example of the present invention is disclosed in accordance with the patent statutes, it is not intended that its scope be limited exactly thereto, except as defined by the following claims.

I claim:

1. A car truck side frame including a compression member made of rolled steel plate worked into a channel section of appropriate contour with depending flanges, a tension member made of rolled steel plate worked into a channel section of appropriate contour with upstanding flanges, said depending flanges being partially telescoped into the adjacent portions of said upstanding flanges, and shear members resting on the web of the second named channel section between said partially telescoped flanges and having upstanding arms on which the adjacent edges of said depending flanges rest, the latter being cut to partially receive said arms and the adjacent portions of said upstanding and depending flanges and said shear members being welded together at appropriate positions to form an integral construction.

2. A car truck side frame including a compression member, a tension member, bolster columns, said tension member being made of a rolled steel plate worked into a channel section of appropriate contour with flanges that upstand throughout its length and a web that is flat at least at the journal box connecting and middle portions of said tension member, portions of said web gradually changing into inverted channel sections between said journal box connecting and middle portions which reach maximum depths at positions at least adjacent said bolster columns, a plate placed between said upstanding flanges with its top side flush with the latter's edges and its ends shaped into depending legs which rest on the tops of the webs of said inverted channel sections, and a spring plank seat resting on said top side of said plate and said edges of said upstanding flanges between said bolster columns, said plate and said spring plank seat being welded to said tension member at appropriate positions to form an integral construction.

3. A car truck side frame including a compression member made from a rolled steel plate section having a longitudinally extending central portion of less thickness than its edge portions and which is worked into a channel section of appropriate contour so that said central portion forms a web and said edge portions form depending flanges, a tension member made from a rolled steel plate section having a longitudinally extending central portion of greater thickness than its edge portions and which is worked into a channel section of appropriate contour with flanges that upstand throughout its length and a web that is flat at least at the journal box connecting and middle portions of said tension member, portions of said web gradually changing into inverted channel sections between said journal box connecting and middle portions, bolster columns between said members, said inverted channel sections of said web reaching maximum depths at least adjacent said bolster columns and said depending flanges of said compression member being partially telescoped into the adjacent portions of said upstanding flanges of said tension member, shear members resting on the web of the second named channel section and having upstanding arms on which the adjacent edges of said depending flanges rest, the latter being cut to partially receive said arms, journal boxes having flat roofs on which the adjacent portions of the web of the second named channel section rests, said roofs being provided with upstanding shoulders which are proximately parallel the adjacent sides of said upstanding flanges and bosses, said portions of said web being apertured to receive said boss, a plate placed between said upstanding flanges with its top side flush with the latter's edges and its ends shaped into depending legs which rest on said inverted channel sections, and a spring plank seat resting on said top side of said plate and said edges of said upstanding flanges, all of the foregoing elements being welded together at appropriate positions to form an integral car truck side frame.

4. A car truck side frame including a compression member made from a rolled steel plate section having a longitudinally extending central portion of less thickness than its edge portions and which is worked into a channel section of appropriate contour so that said central portion forms a web and said edge portions form depending flanges, a tension member made from a rolled steel plate section having a longitudinally extending central portion of greater thickness than its edge portions and which is worked into a channel section of appropriate contour with flanges that upstand throughout its length and a web that is flat at least at the journal box connecting and middle portions of said tension member, portions of said web gradually changing into inverted channel sections between said journal box connecting and middle portions, bolster columns between said members, said inverted channel sections of said web reaching maximum depths at least adjacent said bolster columns, the adjacent edges of said depending flanges of said compression member and said upstanding flanges of said tension member being butted together, shear pins passed transversely through the abutting edges of said flanges, stiffening plates arranged transversely between said upstanding flanges on both sides of said shear pins and with their ends against the insides of said upstanding flanges, journal boxes having flat roofs on which the adjacent portions of the web of the second named channel section rests, said roofs being provided with upstanding shoulders which are proximately parallel the adjacent sides of said upstanding flanges and bosses, said portions of said web being apertured to receive said boss, a plate placed between said upstanding flanges with its top side flush with the latter's edges and its ends shaped into depending legs which rest on said inverted channel sections, and a spring plank seat resting on said top side of said plate and said edges of said upstanding flanges, all of the foregoing elements being welded together at appropriate positions to form an integral car struck side frame.

5. A car truck side frame including a compression member, a tension member, and bolster columns, said tension member being made of a rolled steel plate worked into a channel section of appropriate contour with flanges that upstand throughout its length and a web that is flat at least at the journal box connecting and middle portions of said tension member, portions of said web gradually changing into inverted channel sections between said journal box connecting and middle portions which reach maximum depths at positions at least adjacent said bolster columns.

KARL R. HAMMERSTROM.